United States Patent [19]

Knavish et al.

[11] 3,776,710
[45] Dec. 4, 1973

[54] APPARATUS FOR REFINING GLASS

[75] Inventors: Leonard A. Knavish, Pittsburgh; James R. Schornhorst, New Kensington, both of Pa.

[73] Assignee: PPG Industries, Inc., Pittsburgh, Pa.

[22] Filed: Feb. 18, 1971

[21] Appl. No.: 116,368

Related U.S. Application Data

[63] Continuation of Ser. No. 747,395, July 24, 1968, abandoned.

[52] U.S. Cl.......................... 65/134, 65/137, 65/355
[51] Int. Cl............................................... C03b 5/22
[58] Field of Search....................... 65/355, 134, 137

[56] References Cited
UNITED STATES PATENTS
2,119,949  6/1938  Blau et al.............................. 65/134
1,810,911  6/1931  Ferngren................................ 65/134

FOREIGN PATENTS OR APPLICATIONS
119,189  11/1944  Australia............................... 65/137

*Primary Examiner*—Robert L. Lindsay, Jr.
*Attorney*—Chisholm & Spencer

[57] ABSTRACT

Forced cooling of the bottom of the glass in the refiner of a continuous glass-melting furnace allows changes in the thermal gradients through the glass. This reduces convection flow and convolutions in the glass and thus improves the quality of glass produced.

3 Claims, 7 Drawing Figures

APPARATUS FOR REFINING GLASS

CROSS-REFERENCE TO RELATED APPLICATION

This application is a continuation of our earlier filed copending application Ser. No. 747,395, filed July 24, 1968 now abandoned.

BACKGROUND OF THE INVENTION

In the manufacture of flat glass, whether by the plate process or the float process, measured quantities of glass-making ingredients are fed by a batch feeder into the feeding doghouse of a glass-melting furnace. The usual furnace is a relatively long structure constructed of refractory blocks and is generally divided into three sections, i.e., a melting section, a refining section, and a working section. In some furnaces, floaters or other barriers can be used to effectively separate the sections, at least at the surface of the glass. In other tanks, a drop arch terminating above the glass level effectively separates the melting portion from the refining portion. In any event, there is free communication between the melting and refining portions at the bottom of the furnace.

Heat is applied to the batch ingredients in the melting portion of the furnace, so as to produce a body of molten glass. As molten glass is removed at the working end of the tank, additional batch ingredients are introduced, generally on the surface of the melt, at the feeding end so as to maintain a substantially constant glass level in the furnace. As the batch is melted, the glass generally flows toward and into the refiner, and then into the working end of the furnace.

In the refiner, the glass is permitted to soak, i.e., lose gases and come to a suitable forming temperature. Of course, the surface glass and the bottom glass are different in temperature, that is, a temperature gradient exists therebetween, and a temperature inversion occurs near to the surface of the glass. Temperature differences cause convection flow of glass in the furnace, such that there exists in the conventional furnace a flow of glass, adjacent to the bottom, in the direction to the feeding doghouse. When these convection flows reach a certain magnitude, the working temperature increases beyond its desired level, and an operator will apply surface cooling to lower the working temperature of the glass to the desired level. In this situtation, a condition of instability may occur, and convolutions in the glass may be formed. Such convolutions manifest themselves as defects in the internal quality of the flat glass which is produced and can be observed by a sampling technique which will be described in detail herein. This defect is generally known as convoluted "striae" and are a form of "ream."

In liquids lying in a bath, it is known that, if the bath is hottest (least dense) at its surface and correspondingly less dense as one goes down into the bath, there is no tendency for the bath to become unstable. On the other hand, it frequently occurs that there is a bath of liquid that is colder at its surface than in its body, such that there is a tendency for the less dense material trapped a certain distance below the surface to rise to the surface. In this situation, there is in the temperature gradient of the liquid, a certain distance from the surface, a temperature-inversion point. It is obvious that the deeper that this point is, the more likely it is that there will be a tendency for the hotter liquid beneath it to penetrate the cooler liquid above it, causing instabilities. Such instabilities may be termed "Rayleigh instabilities" because their occurrence or development may be predicted in Newtonian liquids with considerable accuracy by calculating for the liquid involved a Rayleigh number, in accordance with an equation given hereinbelow. For Newtonian liquids, it can be calculated on theoretical grounds that instabilities of the kind mentioned above will occur when the Rayleigh number is greater than about 1,100 and practical experience confirms this.

The Rayleigh number can be determined by the following equation:

$$\text{Rayleigh No.} = \rho^2 d^3 \theta \beta q\, c_p / \eta$$

where
$\rho$=density of the glass, in grams per cubic centimeter;
$d$=depth of temperature inversion, in centimeters;
$\theta$=change of temperature, surface to point of inversion, in degrees Centigrade;
$\beta$=coefficient of thermal expansion of the glass, in reciprocal degrees Centigrade;
$g$=gravitational acceleration, in centimeters per second per second;
$c_p$=specific heat of the glass, in calories per gram per degree Centigrade;
=effective thermal conductivity of the glass, in calories per centimeter-second-degrees Centigrade; and
$\eta$=viscosity of the glass in grams per centimeter-second.

THE INVENTION

It has been discovered that convection flows and thus the unstable convolutions which cause low-quality glass can be reduced materially by reducing the cooling at the surface of the glass in the refiner and, in lieu thereof, apply cooling to the bottom of that mass of glass, which is just the opposite of that which has been heretofore practiced. Surprisingly, the glass mass is more stable in its internal-flow characteristics, and the internal quality is materially improved. No convolutions occur, or if they occur, their magnitude is materially reduced, and they can be eliminated by modifying the applied cooling. The application of cooling to the bottom of the mass of glass changes the temperature-inversion and velocity curves, as will be hereinafter explained.

THE DRAWINGS

THE SPECIFIC EMBODIMENT

Figure 1:
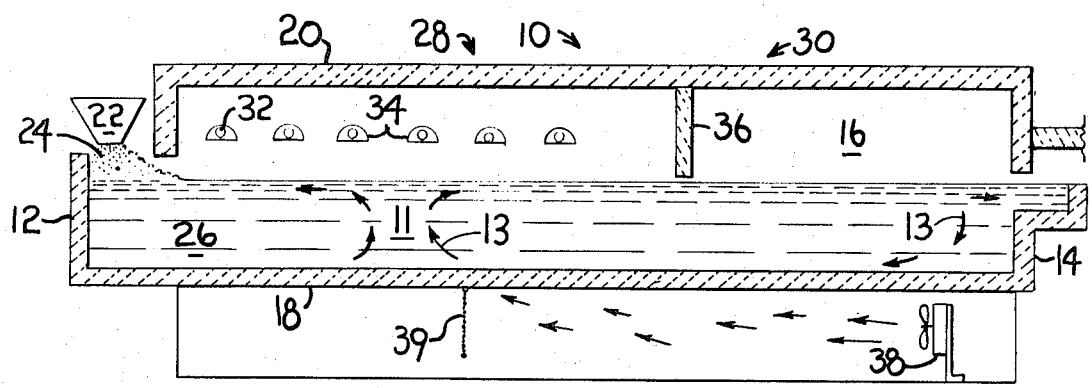
FIG. 1 is a vertical section through a typical glass-melting furnace incorporating this invention.

FIG. 1 shows a glass furnace 10 constructed generally of refractory blocks, so as to include a back wall 12, a front wall 14, side walls 16, a bottom 18, and a crown or roof 20. At the back wall 12, there is a batch feeder 22 which feeds glass-making ingredients 24 onto molten glass 26 in the furnace, so that they melt in the melting portion 28 of the furnace 10. The glass flows to the working end adjacent to the front wall 14 and into the refining portion 30 of the furnace. Heat is applied by burners 32 through ports 34 in the side walls 16. A suitable fuel-air mixture is fed to the burners 34.

The melting portion 28 is separated from the refining portion 30 by a drop arch 36.

According to this invention, forced cooling is applied to the bottom of the glass in the refiner, such as by a blower or a series of blowers 38 located below the tank. Generally, the cooling air is directed by a horizontally positioned blower or fan toward the melting end of the tank. A curtain 39 may be used to protect the melter portion from undue cooling. It is located preferably near the spring zone indicated by the opposing arrows 11, which shows the convection flows. FIG. 1 illustrates, by the arrows 13, typical convection flows that are obtained when using this invention.

Figure 2:
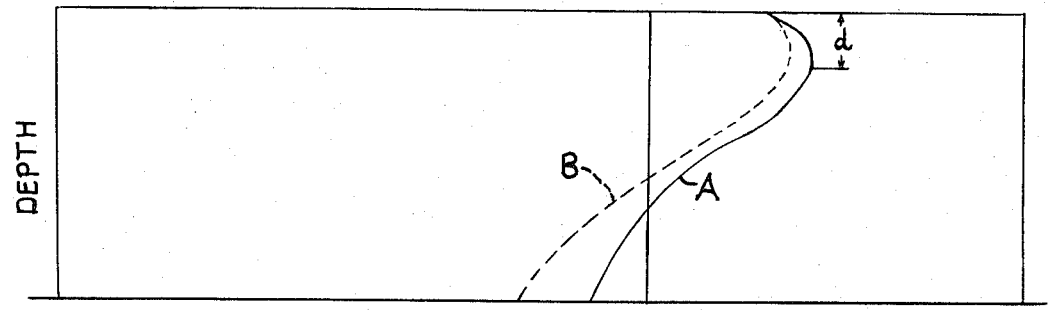
FIG. 2 is a graphic representation of temperature-inversion curves, illustrating the normal curve and the curve resulting from the use of this invention.
Figure 3:
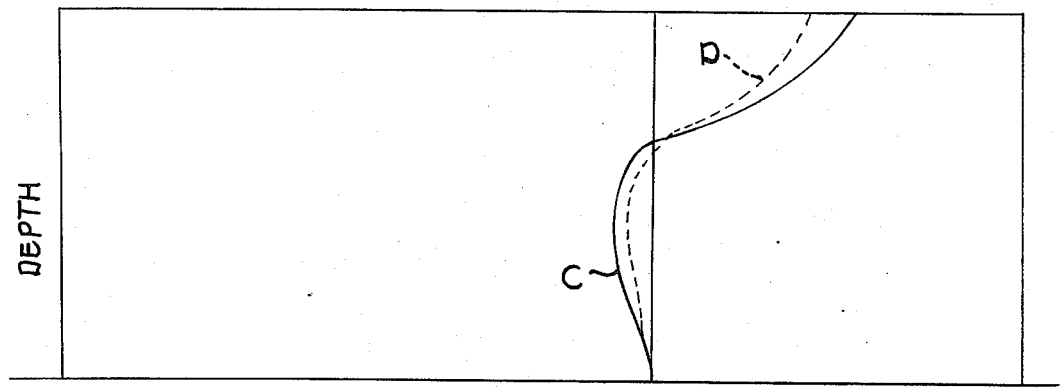
FIG. 3 is a set of curves illustrating velocity profiles, with and without the use of this invention.

FIG. 2 is a graph of glass temperature plotted against glass depth. It shows the temperature-inversion in the glass mass, with and without this invention. The curve A, in solid lines indicates the temperature distribution which is normally observed in the refiner of a glass tank; the curve B indicates the corresponding temperature distribution observed according to this invention. The depth of temperature inversion $d$ for the curve A is below that for the curve B, although the surface temperatures, even without surface cooling, are substantially the same. However, the temperature differential between the surface glass and the bottom glass is increased when the invention is used.

The velocity curves C and D, for the usual operation according to this invention, respectively, show that the surface flow is slower according to this invention such that the glass has longer fining time and thus can be of better quality; the time of residence is important to the fining operation, and most importantly, it is desirable to obtain, as with the invention, more time in which to cool, so that the cooling rate can be lower, thereby reducing the Rayleigh number and avoiding thermal instabilities.

In order to evaluate the internal quality of glass produced, striaegrams of glass samples are made and compared. Striaegrams are made by cutting samples from a ribbon of glass, immersing the samples in a liquid having an index of refraction the same as that of the glass (this eliminates any reflections of light from the cut), passing a light through the glass sample from edge to edge, and photographing the image so produced.

Figure 4A:
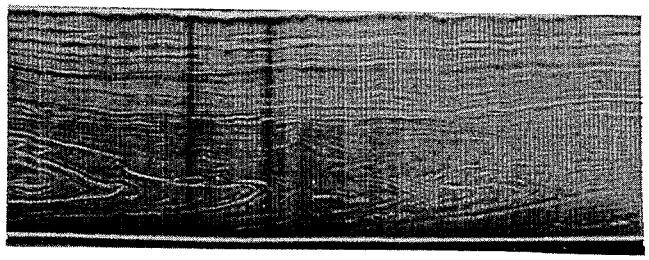
FIGS. 4a and 4b are striaegrams of sections of glass samples illustrating glass produced according to this invention.
Figure 4B:
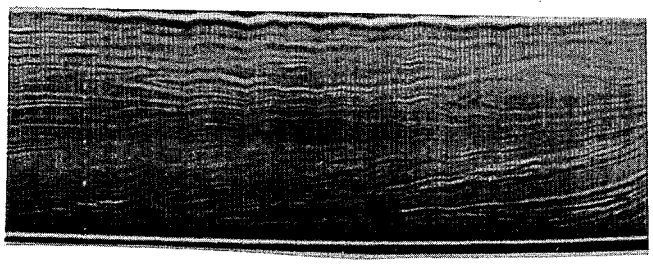
Figure 5A:
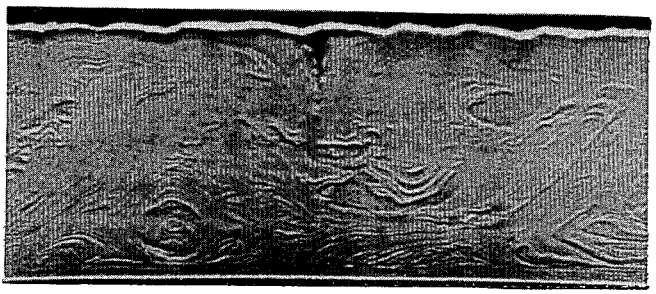
FIGS. 5a and 5b are striaegrams of glass samples illustrating the effects of an instability in the glass mass.
Figure 5B:
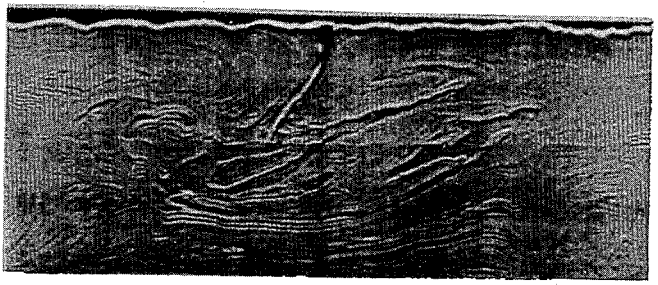

Typical striaegram photographs of quarter-inch-thick glass are illustrated as FIGS. 4a and 4b and 5a and 5b, those of FIGS. 5a and 5b being of glass produced before applying this invention, and those of FIGS. 4a and 4b being of glass produced after applying the invention.

The photographs illustrate what can be defined as ream, i.e., internal, horizontal and parallel layers in flat glass differing in minute chemical composition from surrounding glass or striae, i.e., a form of ream which is non-horizontal or wedge shaped.

The best quality glass is that in which the chemical composition is substantially uniform throughout, i.e., one in which there is little ream, so that the lighter horizontal lines indicate better quality glass than heavy, wedge-shaped lines. It is apparent that the glass produced after applying the herein disclosed invention (FIGS. 4a and 4b) is of improved internal quality over that produced before applying the invention.

SPECIFIC EXAMPLE

The invention has been applied to a glass-melting tank 136 feet in length and 27 feet in width. The melting portion of this tank is 91 feet in length while the refining portion is 45 feet in length. The glass depth is 45 inches throughout the length of the metling and refining section of the tank.

A one million cubic feet per hour blower or fan is beneath the refiner section of the tank and approximately 3 feet before the working section. The blower or fan is positioned to discharge its air approximately horizontally and toward the melting section of the tank. The fan was turned on so as to discharge air at its full capacity onto the bottom of the tank.

Prior to using the invention, portions of glass produced from the tank were similar to that glass shown in FIGS. 5a and 5b, i.e., effects of instabilities existed in the glass. After the blower was turned on and while the teachings of this invention were used, the glass produced was similar to that depicted in FIGS. 4a and 4b.

We claim:

1. In the method of manufacturing glass in which glass-making ingredients are controllably fed into a glass-melting furnace, comprising a melting portion, a refining portion and a working end, wherein heat is applied to said ingredients to melt the same and form a mass of molten glass at least a portion of which then flows from the melting portion of the furnace to the refining portion thereof to be refined and then flows to the working end of the furnace where molten glass is continuously removed and temperature gradients exist in said mass of glass from its top surface to its bottom with a maximum temperature below the top surface of the glass, the improvement which comprises cooling substantially the entire bottom of said mass of glass in the refining portion of the furnace sufficiently to establish a temperature gradient in the glass through its depth having its maximum temperature location moved toward the top surface of the glass and to decrease the maximum temperature of the glass through its depth sufficiently such that thermally induced convection flow in the glass between its top surface and the location of said temperature maximum is substantially eliminated, and protecting substantially the entire bottom of said mass of glass in the melting portion of the furnace from said cooling.

2. The method as recited in claim 1 wherein said cooling is achieved by flowing cooling air along said bottom of the refining portion of said furnace and said protecting from cooling is achieved by interposing a barrier between said refining portion and said melting portion, said barrier being positioned to divert the flow of said cooling air away from said melting portion.

3. The method as recited in claim 1 wherein the cooling is adjusted such that the Rayleigh number as determined by the equation $$\text{Rayleigh No.} = \rho^2 d^3 \theta \beta g c_p / \eta$$

in which $\rho$ = density of the glass
$d$ = depth of temperature inversion
$\theta$ = change of temperature
$\beta$ = coefficient of thermal expansion of the glass
$g$ = gravitation acceleration
$c_p$ = specific heat of the glass
 = effective thermal conductivity of the glass
$\eta$ = viscosity of the glass is approximately 1,100 and below.

* * * * *

UNITED STATES PATENT OFFICE
CERTIFICATE OF CORRECTION

Patent No. 3,776,710　　　　　　　　Dated December 4, 1973

Inventor(s) Leonard A. Knavish and James R. Schornhorst

It is certified that error appears in the above-identified patent and that said Letters Patent are hereby corrected as shown below:

Col. 2, line 13, the equation should read:

$$\text{Raleigh No.} = \frac{\rho^2 d^3 \theta \beta g c_p}{K \eta}$$

Col. 2, line 26, "$K$" should precede the equal sign.

Claim 3, line 57, the equation should read:

$$\text{Raleigh No.} = \frac{\rho^2 d^3 \theta \beta g c_p}{K \eta}$$

Claim 3, line 65, "$K$" should precede the equal sign.

Signed and sealed this 24th day of September 1974.

(SEAL)
Attest:

McCOY M. GIBSON JR.　　　　　　　　C. MARSHALL DANN
Attesting Officer　　　　　　　　　Commissioner of Patents